Figure 1:
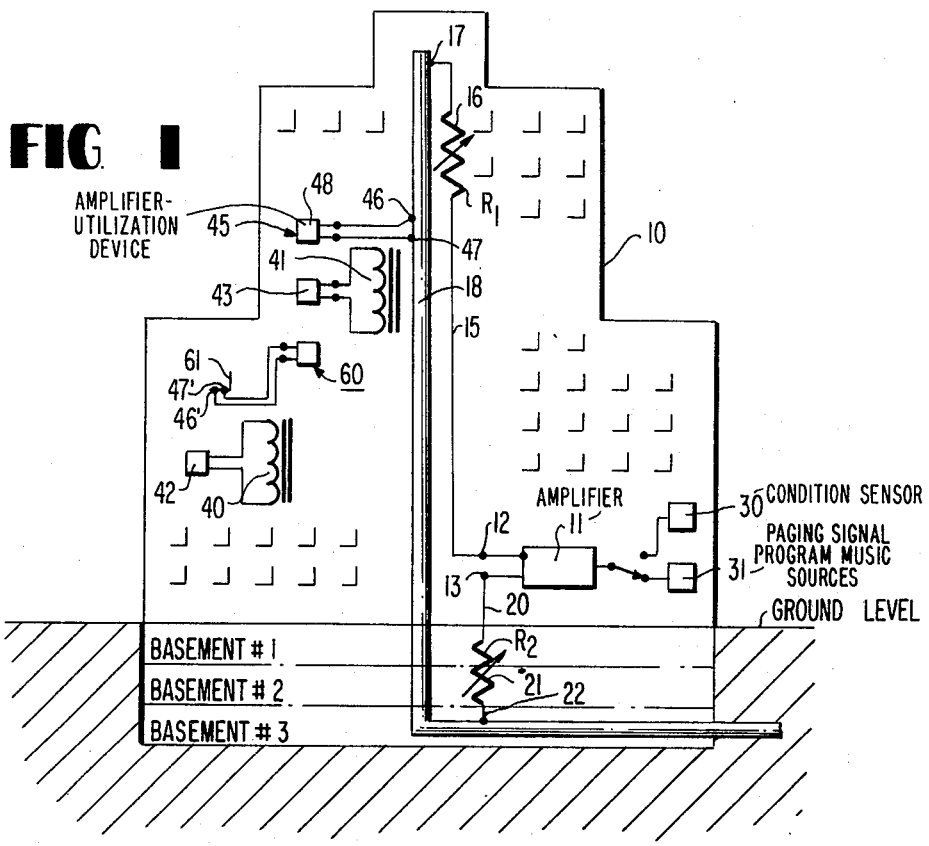

United States Patent [19]
Schaad et al.

[11] 3,978,469
[45] Aug. 31, 1976

[54] METHOD AND APPARATUS FOR COMMUNICATING IN BUILDING STRUCTURES AND PARTS THEREOF PARTICULARLY MULTI-STORY BUILDING

[76] Inventors: Howard A. Schaad, 609 W. Monmouth St., Abingdon, Ill. 61410; Richard L. Randolph, 26 Grande Paseo, San Rafael, Calif. 94903

[22] Filed: June 7, 1971

[21] Appl. No.: 150,429

[52] U.S. Cl. ............................ 340/310 R; 340/416; 179/82
[51] Int. Cl.² ........................................ H04M 11/04
[58] Field of Search ........... 340/310, 311, 312, 416, 340/224; 343/720; 179/82; 325/308

[56] References Cited
UNITED STATES PATENTS

| | | | |
|---|---|---|---|
| 1,989,466 | 1/1935 | Satterlee et al. | 343/720 |
| 2,023,857 | 12/1935 | Satterlee et al. | 340/310 |
| 2,494,451 | 1/1950 | Olson | 340/312 |
| 2,743,434 | 4/1956 | Fleming | 340/310 |
| 2,942,245 | 6/1960 | Wooten, Jr. | 340/311 |
| 3,044,054 | 7/1962 | Sneath | 340/311 |
| 3,191,122 | 6/1965 | Hussey | 340/311 |
| 3,323,063 | 5/1967 | Walker et al. | 178/82 |
| 3,400,221 | 9/1968 | Wolters | 340/310 |
| 3,448,447 | 6/1969 | Tetherow | 340/409 |
| 3,551,890 | 12/1970 | Silverman | 340/171 |

OTHER PUBLICATIONS

J. G. De Graaf, "Selective Paging System Uses Coded Transmission," Electronics, Feb. 26, 1970, pp. 68–70.

*Primary Examiner*—Thomas B. Habecker
*Attorney, Agent, or Firm*—Beveridge, DeGrandi, Kline & Lunsford

[57] ABSTRACT

There is disclosed a method and apparatus for communicating in multi- and single story building structures and parts thereof wherein a signal voltage source is connected to a metallic building structural member which is an integral part of the building. Multi-story buildings at least as high as fifty stories have been excited by utilizing a structural member such as a vertically extending stand pipe and like structural members. In such multi-story structures and in smaller structures such as one story frame, masonry and metal building structures, one of the terminals from the voltage source may be connected to earth ground by stakes or rods driven in the ground. Resistance means are inserted in the lines to limit the short circuit current and to provide a degree of impedance match.

15 Claims, 3 Drawing Figures

U.S. Patent  Aug. 31, 1976  3,978,469

INVENTORS
HOWARD A. SCHAAD
RICHARD L. RANDOLPH

BY Beveridge & De Grandi

ATTORNEYS

METHOD AND APPARATUS FOR COMMUNICATING IN BUILDING STRUCTURES AND PARTS THEREOF PARTICULARLY MULTI-STORY BUILDING

The present invention is directed to improvements in communication systems, particularly for use in multi-story building structures. In the past, inductive communication systems in multi-story buildings, single story buildings and the like have been essentially of the type in which a receiver is activated by fluctuating magnetic signalling field induced from a signal-carrying current flow which is caused to pass through a closed conducting wire loop. The signal flux as induced by the magnetic field falls off rapidly as distance from the conducting wire increases and the space thus covered is severly limited. In our patent application Ser. No. 844,047 filed July 23, 1969, now U.S. Pat. No. 3,660,760 issued May 2, 1972 we disclose an inductive communication system in which an audio signal voltage is used to induce a dynamic magnetic signalling field in and contiguous to the earth's surface and wherein an earth mass is used as an inductive communicating element. In distinction therewith the present invention is akin to the closed loop system because of its dependence on a conductive element which extends for substantial distances, if not completely, through and in the area to be excited. Detection is achieved in several manners, preferably however by the use of an inductive coil receiver like the ones disclosed in our above reference patent application. However, a unique system of detecting the signal is constituted by placing a pair of conductive contact members in spaced relation on the structural member to which the signal has been applied or to a remote structural member which is adjacent to or near the structural member or possibly (but not necessarily) electrically connected thereto and amplifying any signal voltage appearing between the space conductive contact members.

A particular and advantageous application of the invention is in connection with a fire alarm system and for paging and/or music systems for multi-story buildings. In such systems, the metallic building structure or member such as a stand pipe running in a generally vertical direction in the building is used as the main transmitting element. A signal (alarm/paging/music) voltage source having output terminals is connected through a pair of low ohmic value resistors to the terminal ends of the stand pipe. At each level or story of the multi-story building, sensors are provided, preferably for sensing magnetic fields. The signals thus sensed are amplified and connected to a utilization device which provides an audible and/or visible alarm to occupants of the structure. In another aspect, and of particular importance for alarm conditions, a rechargeable power supply is provided for the amplifier and rechargeable power supply is connected to the electrical distribution system of the building and turned on automatically on failure of power in the building.

Figure 2:
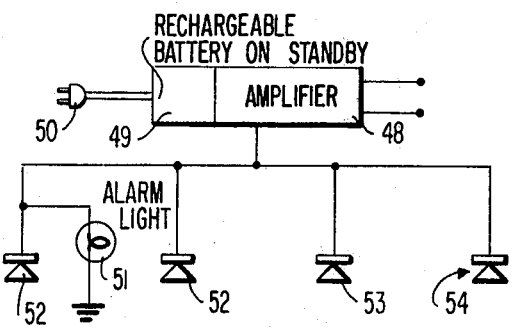
Figure 3:
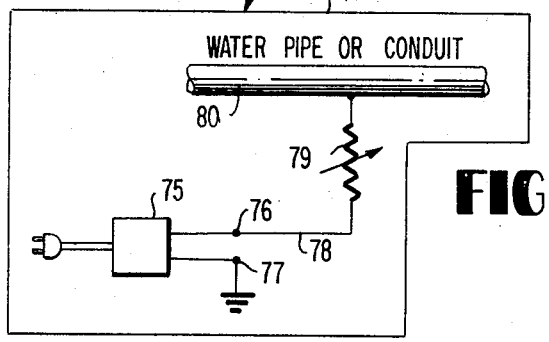

The above and other objects advantages and features of the invention will become more apparent from the following specification when considered with the accompanying drawing wherein:

FIG. 1 is an illustration of a multi-story building incorporating the invention, FIG. 2 is a block diagram of an electrical circuit used in the sensor system on one or more floors of the building; and FIG. 3 is a diagrammatic illustration of a one story building incorporating a further aspect of the invention.

FIG. 1 illustrates a multi-story building 10 and more specifically, it is symbolic of a fifty story building existing at Number One New York Plaza in the city of New York. This building is fifty stories in height and in the drawing has three floors which extend below the ground level, labeled as "Basement No. 1 . . . Basement No. 3". A signal source 11 is constituted by an audio amplifier which may be of the integrated circuit type or tube type, has a pair of output terminals 12 and 13 respectively. Output terminal 12 is connected by a wire 15 and through a 2 to 5 ohm (D.C. Measurement) resistor 16 to the end 17 of a stand pipe 18. Stand pipe 18 was about 6 inches in diameter and made of cast steel pipe with joints about every 10 feet; in the building of the example, the stand pipe was valved at every floor for coupling to a firs hose. The usual jumper between joints (not shown) was provided in the normal construction of the building so that there ws electrical continuity between the ends of the pipe 18. Amplifier 11 was located on about the 28th floor of the building, but could have been located on any floor or basement. Wire 15 was a single, No. 12, stranded copper wire and was run up the stairwell of the building. The second output terminal 13 from amplifier 14 was connected in a similar manner by a wire 20 which extended down the same stairwell and connected through a second 2 to 5 ohm (D.C. measurement) resistor 21 to a lower end or terminal 22 of stand pipe 18. The output signal appearing at terminals 12 and 13 was about 65 volts AC (at 1,000 cycles test signal) and the output current measured about 3 amps. The Bogen model DC 200 A unit referenced in our U.S. Pat. No. 3,660,790 is satisfactory, however, any other conventional audio power amplifier would suffice. Resistor 16 and resistor 21 each were set and measured to be about 2 ohm each DC resistance. With this arrangement, the signal extended substantially throughout the building including a number of remote areas. The signal was particularly strong wherever there was a water pipe as for example sprinkler head, baths, showers and toilet facilities, etc. Moreover, the signal was detected at window sills and the like in the manner to be described later herein wherein a pair of spaced conductive contact terminals were applied, by way of example, from about 2 to about 6 feet apart to the window frame, for example to detect a useable signal.

The connection to the stand pipe at ends 17 and 22 was by way of a conventional grounding clamp not shown. As indicated, at least one input to amplifier 14 may be constituted by inputs from one of several alarm condition sensors 30 which may be switched in automatically or scanned in sequence as may be desired. Sensors 30 may be of the photoelectric type fire detector shown in U.S. Pat. No. 2,640,975. Moreover, there is shown a program music source 31 which may be connected into the system to supply program music throughout the entire building if this be desired. Source 31 could be a paging signal source. There was a second stand pipe in the building used for the above demonstration wherein the stand pipe extended to about the 28th floor of the building. The signal was picked up in the manner described herein by way of the space contacts applied to the second stand pipe structure. As indicated, resistors 16 and 21 may be adjustable so as to provide a limited degree of impedance matching properties. However, an important function of these resistors is to limit the current since it is apparent that the stand pipe 18, except for the length thereof could constitute almost a near short circuit on the output of amplifier 14. The 4 ohms of resistance which were added constitute in effect the 4 ohms of matching impedance and hence the equivalent of connecting a 4 or 8 ohm speaker thereto. As indicated above, the signal was noted in almost all area as well as on the outside walls near a building near the air duct areas. While it is not intended to exclude large planar metallic panels and exterior walls of such large structures it may be noted that such large surfaces are not as suitable as the stand pipe, or like structures of the building for the purposes of this invention. The reason for this is not fully understood but is believed to be due to the low current density in any selected current path in such exterior panels.

In FIG. 1 there is shown several different ways of detecting the signal. First, and in a preferred manner there is shown inductive coil detector systems 40 and 41 connected to an amplifier-utilization device 42 and 43 respectively. Such detector coil and amplifier-utilization device units may be constructed somewhat similar to the receiver units disclosed in our above referenced patent application Ser. No. 844,047. Moreover, such inductive coil detector systems may be other forms known in the art. However, the flat coil core type disclosed in our above referenced application is preferred because of its sensitivity and particular design for this type signaling system. A second form of signal detection is disclosed at 45. In this system, a pair of spaced conductive contacts 46 and 47 are placed in conductive contact relation at a pair of spaced points on the structural member namely building pipe 18 which is being excited by the signal source. It is not clear whether the signal detected between the spaced contact members is due to the conductive current or to eddy current in the member. However, it is clear that when such conductive contact members are contacting such an element, there is a signal produced between the terminals 46 and 47 which may be amplified by an amplifier-utilization device 48.

As shown in FIG. 2, the amplifier may be driven by a rechargeable battery 49 which is connectable through a mail plug 50 to a wall outlet not shown, the rechargeable battery being on a standby basis so that in the event of power failure it becomes rendered operative in a well known manner. The amplifier 48 supplies a plurality of speaker units 51, 52, 53, 54 which may be distributed uniformly about the floor of the building. It is apparent that one such amplifier may supply several floors of a building structure.

As shown at 60, a pair of terminals 46' and 47' are shown as contacting a window sill 61 which may not be in direct conductive relation with stand pipe 18. It is believed that the signal currents which flow in such window sill type structures are due primarily to eddy currents or induced current which flow in the closed loop constituted by such metallic window sill structures. Nevertheless, the signal which is detected in many other areas of the building by coil systems as mentioned earlier, is also detectable at such window sills by a pair of spaced conductive contact members contacting such window sill member. It seems that the further apart the two terminals contact the window sill the signal gets slightly stronger.

Referring now to FIG. 3, there is shown a single story metallic building 70 (generally known in the trade as a Butler building) having metallic side walls 71 on a concrete slab 72. (The walls could be wood, masonry or plastic) Inside each building, an amplifying unit 75 has a pair of output terminals 76 and 77. Output terminal 77 is connected to ground in the same manner as the output terminals are connected to "ground" as in our patent application Ser. No. 844,047. Output terminal 76 however is connected through a No. 12 wire 78 and through a 0.5 ohm resistor 79 to a water pipe or conduit 80. Amplifier 75, as an example, was a 75 watt Harmon Kardon standard audio amplifier. It had internal terminals like those shown in our above referenced patent application. It will be noted that the terminal 77 is connected directly to the grounding terminal whereas terminal 76 is connected through a half ohm resistor to water pipe or conduit 80.

It will be appreciated that the system shown in this fabrication, like the one shown in our application Ser. No. 844,047 may be used as a paging system by modulating the signal applied to the transmitting elements. For example, selected code permutations of various tone signals may be used for transmitting to receiver which have frequencies selective arrangements therein for detecting codes assigned to particular receivers.

In some multi-story building structures, there will be nulls or low signal strength areas. Obviously, it is highly desirable that in the location of the receiver units, these null areas be avoided when installing fire alarm systems.

The invention is not to be limited to the exact form shown in the drawing for many changes may be made, some of which are suggested herein, without departing from the scope of the following claims.

We claim:

1. A fire alarm communication system for a multi-story building comprising in combination,
   a metallic building structural member running generally in a vertical direction in said multi-story building from an upper story thereof to a lower story thereof and vice versa,
   an alarm signal voltage source hving a pair of output terminals,
   means connecting one of said output terminals to an end of said structural member at said upper story of said multi-story building,
   means connecting the other of said output terminals to another end of said structural member at a lower story of said multi-story building,
   one of said structural member and means connecting having an impedance matching means therein,
   and means at each of the levels of said multi-story building to sense said signals and produce an alarm signal for the occupants of said building at each of said floors.

2. The invention defined in claim 1 wherein said means at said selected levels of said building to sense such signals include a remote magnetic sensing member, an amplifying means connected to said member, and a utilization device connected to receive the output of said amplification means.

3. The invention defined in claim 2 including a rechargeable power supply for said amplifying means,
   and means connecting said rechargeable power supply means to the electrical distribution system of said multi-story building.

4. Apparatus for communicating in a multi-story building comprising the combination of
   1. an audio signal voltage source having a pair of output signal terminals,
   2. a metallic structural member forming an integral part of said building, said metallic structural member running generally in a vertical direction from an upper story of said building to a lower story thereof and having electrical continuity therebetween,
   3. means connecting one of said output signal terminals to the upper end portion of said metallic structural member of said building and,
   4. means connecting the other of said signal terminals to said metallic structural member at one end thereof in one of said lower stories,
   one of said structural member and connecting means having an impedance matching means therein,
   5. means for detecting a signal at a floor intermediate said upper and lower stories, and
   6. means amplifying the detected signal and applying same to a utilization device.

5. Invention defined in claim 4 wherein said metallic structural member is constituted by a stand pipe in said building.

6. The invention defined in claim 4 wherein the said means for detecting includes a coil for detecting a magnetic field flux variation in said building.

7. The invention defined in claim 4 wherein said means for detecting includes a pair of conductive contact members in spaced conductive contacting relation on said structural member and means amplifying any signal voltage appearing between said spaced conductive contact members.

8. The invention claimed in claim 7 wherein said conductive contact members are spaced between about 6 inches apart and about 6 feet apart.

9. The invention defined in claim 4 wherein said means connecting one of said output terminals to the upper end of sid structural member includes a low ohmic value variable resistance element.

10. The invention defined in claim 4 wherein said means connecting said other of said signal terminals to said metallic structural member includes a low ohmic value variable resistance element.

11. The invention defined in claim 9 wherein said resistance element has a variable from about 2 to about 5 ohms.

12. Apparatus for exciting a metallic building structure member for use as an inductive communication element, including, a signal voltage source and at least a pair of output terminals therefor, first connector means for connecting one of said terminals to one end portion of said metallic building structure member, second connector means for connecting said second terminal in signal transmitting relation to said metallic building structure member and resistance means in series circuit with one of said connector means.

13. The invention defined in claim 12 wherein said resistor has a value of about 0.5 ohm (Direct Current measurement).

14. The invention defined in claim 12 wherein each said connector means connects to said metallic structural member, and wherein there is a resistor in each of said connector means, and wherein each resistor has a value in the range from about 2 ohm to about 5 ohm.

15. A method of communicating in a multi-story building having a metallic structural member running generally vertically in a direction from an upper story of said building to a low story and having electrical continuity therebetween and a pair of electrical connections proximate the ends thereof, respectively, comprising the steps of
   1. providing an audio signal voltage at a pair of signal terminals on a signal source,
   2. applying the audio signal from said source to said metallic structural member through a matching impedance and to said connectors, one of said structural member and electrical connectors substantially matching the impedance of said signal source, to cause said structural member to induce a radiating magnetic signal field in said building,
   3. inductively detecting a signal at a floor intermediate said upper and lower stories by detecting said magnetic signal field in said building, and
   4. amplifying the detected signal and applying same to a utilization device.

* * * * *